(12) United States Patent
Yoshioka et al.

(10) Patent No.: US 6,259,182 B1
(45) Date of Patent: Jul. 10, 2001

(54) CAR AC GENERATOR WITH A SLIP RING SUPPORT AND A SLINGER UNIT THAT COOPERATE TO FORM A LABYRINTH THAT PREVENTS FLUID ENTRY INTO AN INTERIOR CHAMBER

(75) Inventors: Nobuatsu Yoshioka; Shigeru Onoue; Junichiro Otsuka, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/303,567

(22) Filed: May 3, 1999

(30) Foreign Application Priority Data

Nov. 27, 1998 (JP) ................................... 10-336844

(51) Int. Cl.$^7$ ........................... H02K 5/10; H02K 19/22; H02K 13/00
(52) U.S. Cl. ............................................ 310/232; 310/239
(58) Field of Search ............................... 310/232, 88, 242, 310/239; 277/303, 412, 419

(56) References Cited

U.S. PATENT DOCUMENTS

| | | | |
|---|---|---|---|
| 4,335,886 | * 6/1982 | Frey et al. | 277/25 |
| 4,476,410 | * 10/1984 | Wolcott | 310/228 |
| 5,244,216 | * 9/1993 | Rhode | 277/53 |
| 5,345,132 | * 9/1994 | Sasaki et al. | 310/239 |
| 5,639,095 | * 6/1997 | Rhode | 277/1 |
| 5,825,114 | * 10/1998 | Mukai | 310/251 |

FOREIGN PATENT DOCUMENTS

| | | | |
|---|---|---|---|
| 318009 | * 5/1989 | (EP) | 310/232 |
| 56-091646 | * 7/1981 | (JP) | 310/232 |
| 2-27904 | 6/1990 | (JP) . | |
| 4-1400038 | * 5/1992 | (JP) | 310/232 |
| 8-294257 | * 11/1996 | (JP) | 310/232 |

* cited by examiner

*Primary Examiner*—Karl Tamai
(74) *Attorney, Agent, or Firm*—Sughrue, Mion, Zinn Macpeak & Seas, PLLC (57) ABSTRACT

To prevent water entering a labyrinth from flowing into contact portions between slip rings and brushes, the labyrinth is formed as a stepped structure by an annular slinger-side stepped portion projecting toward a generator shaft from the inner peripheral surface of a slinger unit and a slip ring-side stepped portion projecting toward the slinger unit from the outer peripheral surface of a slip ring support unit.

8 Claims, 8 Drawing Sheets

CAR AC GENERATOR WITH A SLIP RING SUPPORT AND A SLINGER UNIT THAT COOPERATE TO FORM A LABYRINTH THAT PREVENTS FLUID ENTRY INTO AN INTERIOR CHAMBER

BACKGROUND OF THE INVENTION

1. Field of the Invention

The present invention relates to a car AC generator and, particularly, to a water-proof structure for slip rings and brushes.

2. Description of the Prior Art

Figure 8:
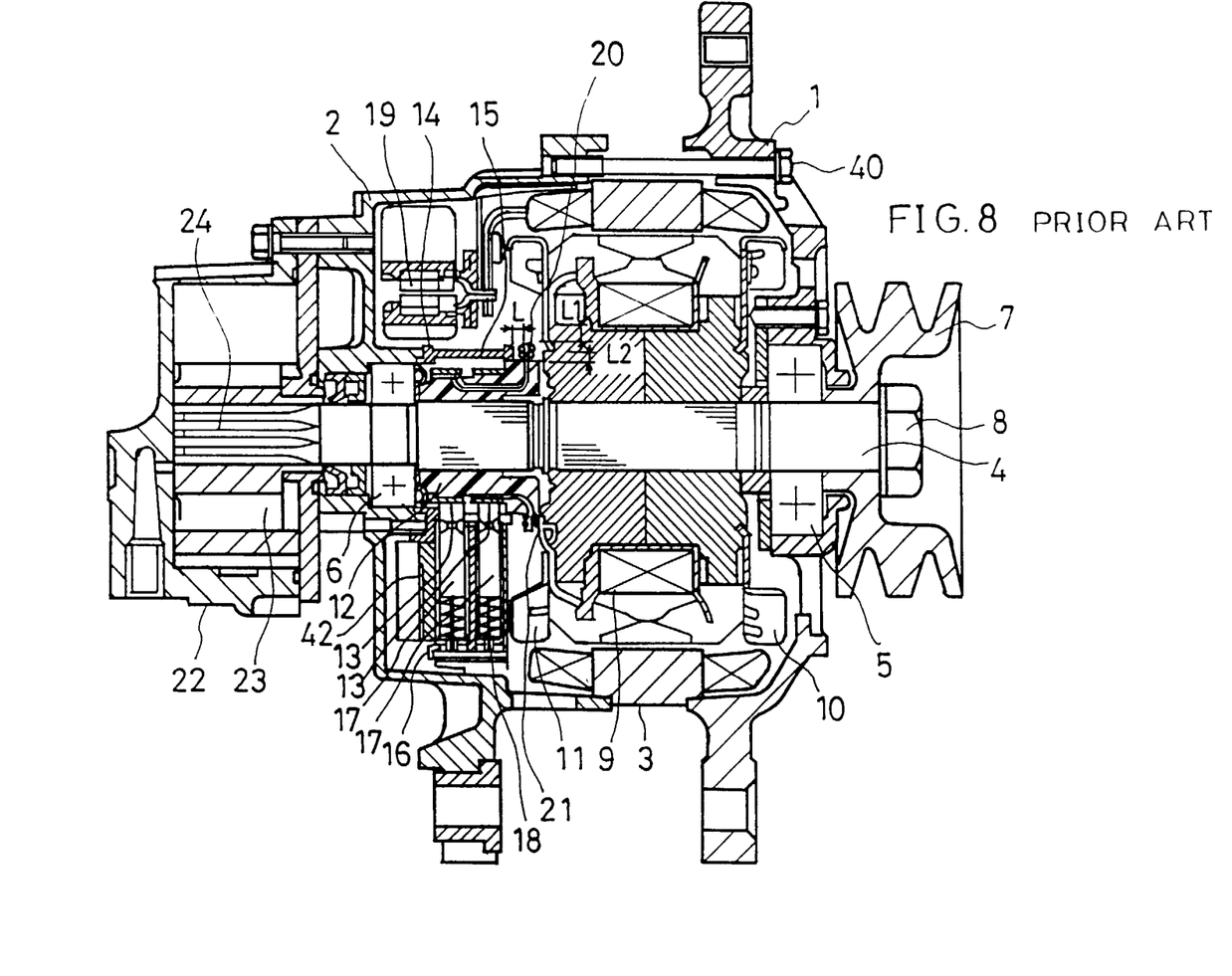
FIG. 8 is a sectional view of a car AC generator equipped with a vacuum pump of the prior art.
Figure 9:
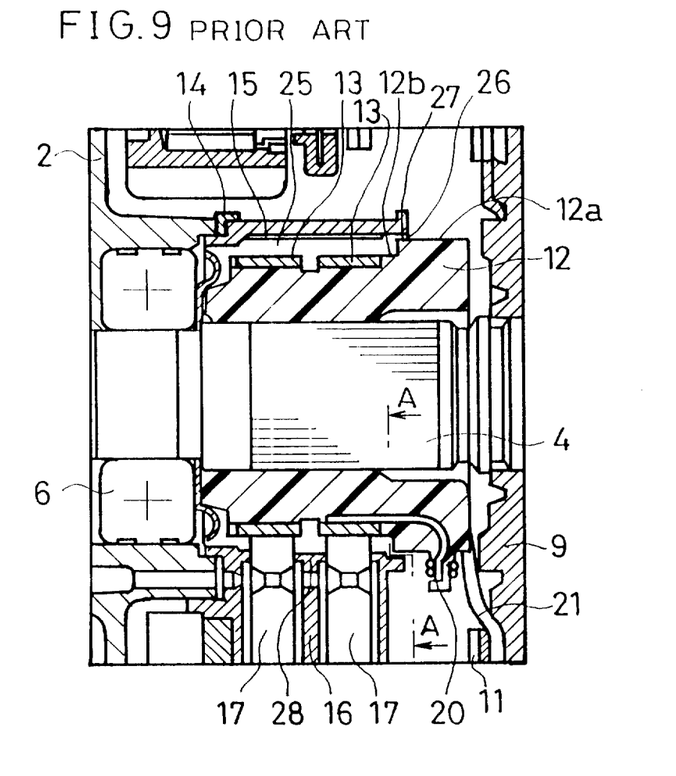
FIG. 9 is an enlarged sectional view of slip rings, brushes and parts therearound of FIG. 8.
Figure 10:
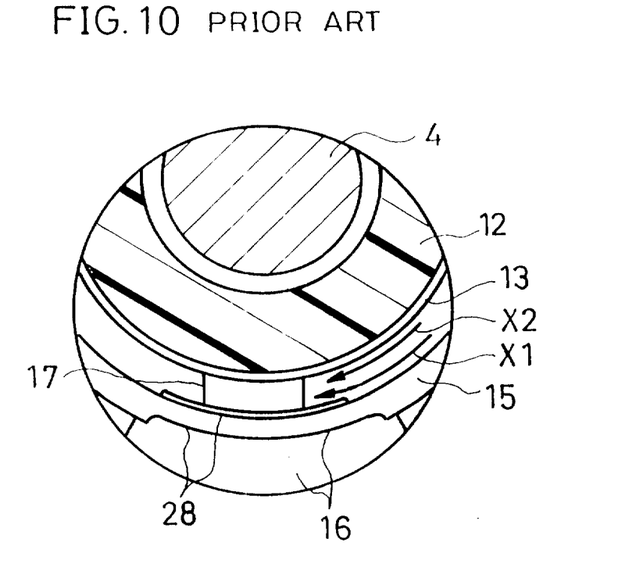
FIG. 10 is a sectional view cut on line A—A of FIG. 9.

FIG. 8 is a sectional view of a car AC generator equipped with a vacuum pump of the prior art, FIG. 9 is an enlarged sectional view of slip rings 13, brushes 17 and parts therearound shown in FIG. 8, and FIG. 10 is a sectional view cut on line A—A of FIG. 9. In FIG. 8, reference numeral 1 denotes a bracket front and 2 a bracket rear both of which are arranged to face each other to form the outer shell of the generator. Denoted by 3 is a cylindrical stator which consists of a core and a coil and is fastened to the peripheral wall of the bracket front 1 and the peripheral wall of the bracket rear 2 by a bolt 40 in the inside space surrounded by the bracket front 1 and the bracket rear 2 of the outer shell of the generator. Denoted by 4 is a generator shaft which is installed in the center portions of the bracket front 1 and the bracket rear 2 in such a manner that it can rotate by a bearing front 5 and a bearing rear 6. Reference numeral 7 denotes a pulley which is fastened to the generator shaft 4 projecting forward from the bracket front 1 by a nut 8 in such a manner that it can rotate together with the generator shaft 4. Denoted by 9 is a cylindrical rotor which consists of a set of a magnetic pole and a field coil and is fitted in the stator 3 in such a manner that it can rotate together with the generator shaft 4. Denoted by 10 is a fan front which is fixed to the front side of the magnetic pole of the rotor 9 and 11 a fan rear which is fixed to the rear side of the magnetic pole of the rotor 9. Denoted by 12 is a cylindrical slip ring support unit made from a synthetic resin and fixed to the generator shaft 4 between the rotor 9 and the bearing rear 6 in such a manner that it can rotate together with the generator shaft 4. Denoted by 13 is a plurality of annular slip rings which are spaced apart from one another in a direction parallel to the axial direction of the generator shaft 4 and fixed to the outer peripheral surface of the slip ring support unit 12. Denoted by 14 is a packing and 15 a cylindrical slinger unit made from a synthetic resin and fixed to the center portion of the bracket rear 2 through the packing 14 in such a manner that it surrounds the slip ring support unit. Denoted by 16 is a brush holder unit projecting outward from part of the slinger unit 15 and 17 a plurality of brushes which correspond to the number of the slip rings 13 and are inserted into the brush holder unit 16 and whose end portions projecting into the inside of the slinger unit 15 from the brush holder unit 16 are each in contact with the slip rings 13. Denoted by 18 is a brush spring for pressing the plurality of brushes 17 against the slip rings 13 elastically, 42 a regulator which is fixed to the brush holder unit 16, 19 a rectifier which is composed of diodes and the like and fixed to the peripheral wall of the bracket rear 2 outside the slinger unit 15. Denoted by 20 is a slip ring terminal lead wire which projects outward from the slip ring support unit 12, 21 a coil lead wire extending from the field coil of the rotor 9 and connected to the slip ring terminal lead wire 20, 22 is a vacuum pump which is installed outside the bracket rear 2, and 23 a vacuum pump rotor which is mated with the spline unit 24 of the generator shaft 4 projecting backward from the bracket rear 2 in such a manner that it can rotate together with the spline unit 24.

A description is subsequently given of the operation of the car AC generator equipped with a vacuum pump when it is mounted on an automobile. When a driver turns on the ignition switch of the automobile while the AC generator equipped with a vacuum pump is installed outside the cylinder block of an engine and a ring-shaped belt is stretched between a pulley provided on the crank shaft of the engine and the pulley 7 of the car AC generator equipped with a vacuum pump, a current runs through an ignition coil from the battery of the automobile to start the engine and an excitation current runs from the battery to the field coil of the rotor 9 through the regulator 42, the brushes 17 and the slip rings 13. In this state, when the generator shaft 4 turns by the start of the engine and the rotor 9 rotates, 3-phase AC induced electromotive force is generated in the coil of the stator 3, rectified by the rectifier 19 and charged into the battery. By the rotation of the rotor 9, the fan front 10 and the fan rear 11 are rotated and air in the engine room of the automobile is supplied into the inside space of the outer shell of the generator from the inlet port of the bracket front 1 and the inlet port of the bracket rear 2 to cool such parts as the stator 3, the rotor 9, the regulator 42 and the rectifier 19 in the inside space of the outer shell of the generator and is exhausted into the engine room from the outlet port of the bracket front 1 and the outlet port of the bracket rear 2.

In the car AC generator equipped with a vacuum pump of the prior art, as shown in FIG. 9, the space between the bracket rear 2 and the slinger unit 15 is made waterproof by the packing 14. However, since the slinger unit 15 is fixed to the bracket rear 2 and the slip rings 13 turn together with the generator shaft 4, a gap 25 is formed between the slinger unit 15 and the slip ring support unit 12. When water enters the inside space of the outer shell of the generator from the inlet ports, outlet ports and the like of the bracket front 1 and the bracket rear 2, there is a possibility that the water enters the gap 25 from an opening 26 located on the front side (pulley side) of the slinger unit 15. Therefore, a water-proof structure is desired for preventing water entering the gap 25 from the opening 26 from reaching contact portions between the slip rings 13 and the brushes 17. However, a labyrinth 27 defined by the inner peripheral surface of the slinger unit 15 and the outer peripheral surface of the slip ring support unit 12 has a shape disadvantageous for waterproofing. That is, the inner peripheral surface of the slinger unit 15 is a surface parallel to the generator shaft 4. The outer peripheral surface of the slip ring support unit 12 has an opening side surface 12a parallel to the inner peripheral surface of the slinger unit 15 and a slip ring side surface 12b which falls toward the generator shaft 4 from the opening side surface 12a.

Therefore, since the generator shaft 4 turns during the operation of the generator, water entering from the opening 26 is scattered toward the slinger unit 15 from the opening side surface 12a of the slip ring support unit 12 by centrifugal force, and the scattered water flows down along the inner peripheral surface of the slinger unit 15 as shown by an arrow X1 in FIG. 10, goes over a brush seat 28 which is provided inside the brush holder unit 16 to surround the brushes 17 from the inner peripheral surface of the slinger unit 15 and reaches the brushes 17. Therefore, there is a possibility that water flows into the gap between the brushes 17 and the brush seat 28.

Although the generator shaft 4 stops turning during the suspension of the generator, when water flows into the slip ring side surface 12b from the opening side surface 12a of the slip ring support unit 12 through the opening 26 by vibration transmitted to the AC generator equipped with a vacuum pump from the automobile, there is a possibility that the water flows down along the slip ring side surface 12b as shown by an arrow X2 in FIG. 10 and runs into the contact portions between the slip rings 13 and the brushes 17.

Car AC generators are divided into car AC generators equipped with a vacuum pump and car AC generators without a vacuum pump. It is very common that as many parts as possible are shared by these two different types of car AC generators to reduce costs. Describing this point, as shown in FIG. 8, in a car AC generator equipped with a vacuum pump, to ensure connection between the vacuum pump rotor 23 and the generator shaft 4, the diameter of the spline unit 24 is made large. As for the assembly procedure of parts to the generator shaft 4, the rotor 9 is press fitted onto the generator shaft 4 from the front side using such an apparatus as a press. Using such an apparatus as a press, the slip ring support unit 12 including the slip rings 13 and the slip ring terminal lead wire 20 is press fitted onto the generator shaft 4 from the rear side. After the coil lead wire 21 of the rotor 9 is connected to the slip ring terminal lead wire 20 in this state, the fan front 10 and the fan rear 11 are welded to the core of the rotor 9. According to this assembly procedure of parts, the fan front 10 and the fan rear 11 are prevented from being crushed by the press fitting tool of the press and the fan rear 11 can hold the intermediate portion of the coil lead wire 21 at an accurate position. However, since a clearance L2 between the inner diameter of the fan rear 11 and the outer diameter of the slip ring support unit 12 and a clearance L1 in a radial direction between the coil lead wire 21 of the fan rear 11 and the slip ring terminal lead wire 20 must be made large, the diameters of the generator shaft 4, the bearing rear 6, the slip ring support unit 12, the slip rings 13 and the slinger unit 15 are larger than those of a car AC generator without a vacuum pump.

Figure 11:
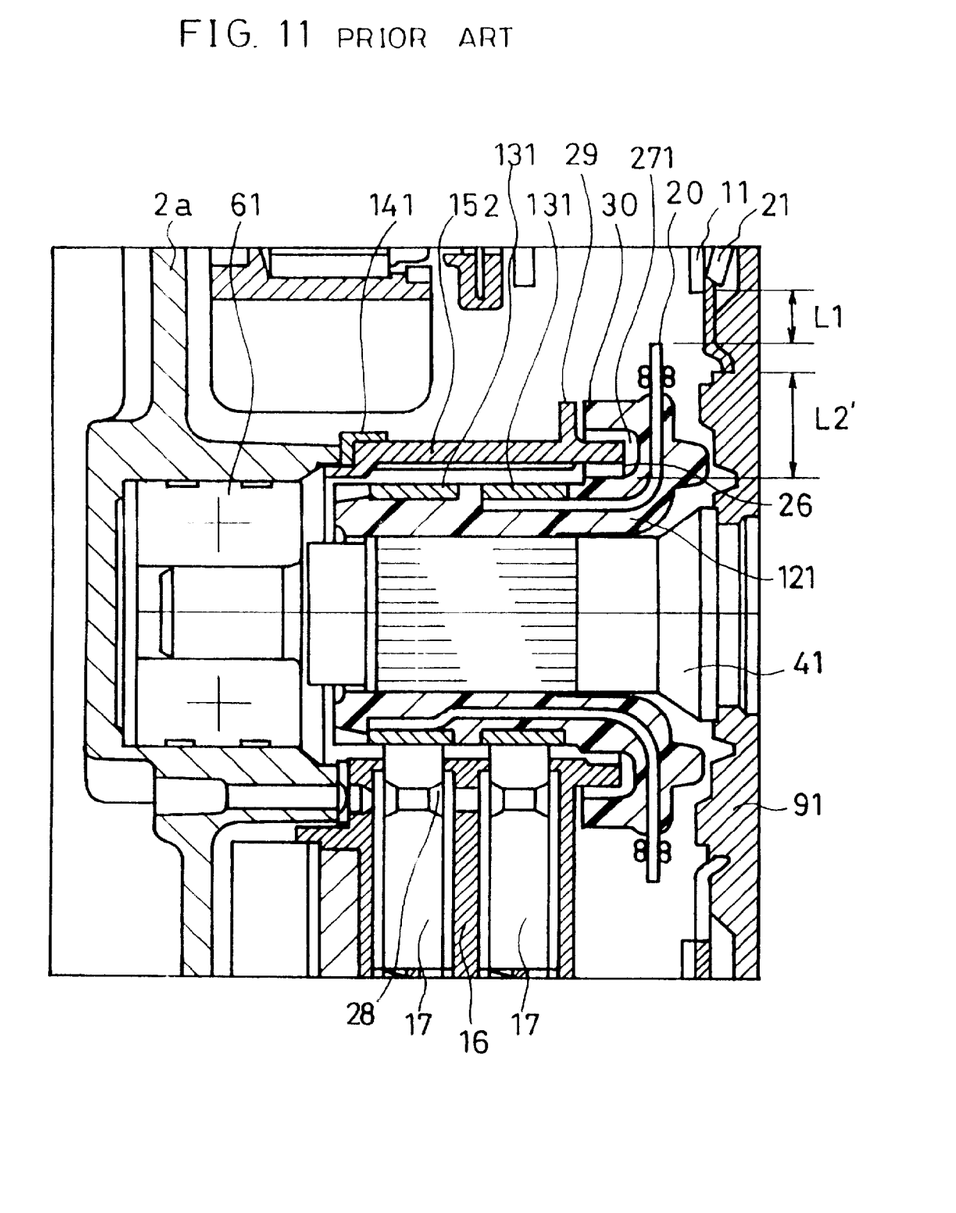
FIG. 11 is an enlarged sectional view of slip rings, brushes and parts therearound of the car AC generator without a vacuum pump of the prior art.

FIG. 11 is an enlarged sectional view of slip rings 131, brushes 17 and parts therearound of a car AC generator without a vacuum pump of the prior art. In FIG. 11, common parts are given the same reference numerals as those of the above car AC generator equipped with a vacuum pump and non-common parts are given different reference numerals. The front portion of a slip ring support unit 121 fitted onto a generator shaft 41 covers the opening 26 of a slinger unit 152 from inside to outside, and a labyrinth 271 is formed to have a U-shaped section and opened in a circumferential direction by the outer annular projection 29 of the slinger unit 152 and the opening 30 of the slip ring support unit 121. Therefore, unlike the car AC generator equipped with a vacuum pump, in the car AC generator without a vacuum pump, water hardly enters the labyrinth 271 but there is a possibility that water entering the labyrinth 271 flows into the gap between the brushes 17 and the brush seat 28 as described above and also flows into the contact portions between the slip rings 131 and the brushes 17 during both of the operation and suspension of the generator.

Since the fan rear 11 is shared by the car AC generator equipped with a vacuum pump and the car AC generator without a vacuum pump and the slip ring terminal lead wire 20 and the coil lead wire 21 are connected to each other, the clearance L1 of the car AC generator equipped with a vacuum pump must be made the same in size as the clearance L1 of the car AC generator without a vacuum pump (L1=L1). Therefore, the clearance L2 (see FIG. 8) between the inner diameter of the fan rear 11 and the outer diameter of the slip ring support unit 12 of the car AC generator equipped with a vacuum pump becomes much smaller than L2' of the car AC generator without a vacuum pump (see FIG. 11)(L2<L2'). As a result, the labyrinth 27 of the car AC generator equipped with a vacuum pump cannot be made the same in shape as the labyrinth 271 of the car AC generator without a vacuum pump. Reference symbol 2a in FIG. 11 denotes a bracket rear, 61 a bearing rear and 141 a packing.

SUMMARY OF THE INVENTION

It is therefore an object of the present invention to provide a car AC generator which improves the water-proof structure of a labyrinth so as to prevent water entering the labyrinth from flowing into contact portions between slip rings and brushes.

According to a first aspect of the present invention, there is provided a car AC generator having a labyrinth which is defined by the outer peripheral surface of a cylindrical slip ring support unit fixed to a generator shaft and the inner peripheral surface of a cylindrical slinger unit fixed to the outer shell of the generator so as to surround the slip ring support unit, wherein the labyrinth is formed as a stepped structure by an annular slinger-side stepped portion projecting from the inner peripheral surface of the slinger unit toward the generator shaft and an annular slip ring-side stepped portion projecting from the outer peripheral surface of the slip ring support unit toward the slinger unit, and an annular groove is formed in the outer peripheral surface of the slip ring support unit.

According to a second aspect of the present invention, there is provided a car AC generator, wherein the annular groove is located between the slinger-side stepped portion and the opening portion of the slinger unit.

According to a third aspect of the present invention, there is provided a car AC generator, wherein banks extending in an axial direction are formed on the inner peripheral surface of the slinger unit.

According to a fourth aspect of the present invention, there is provided a car AC generator, wherein grooves extending in an axial direction are formed in the inner peripheral surface of the slinger unit.

According to a fifth aspect of the present inventor, there is provided a car AC generator, wherein an annular moat is formed in an annular stepped surface located between the inner peripheral surface of the slinger unit and the slinger-side stepped portion.

According to a sixth aspect of the present invention, there is provided a car AC generator, wherein an annular bank is formed on the outer peripheral surface of the slip ring support unit on the opening side of the annular groove.

The above and other objects, features and advantages of the invention will become more apparent from the following description when taken in conjunction with the accompanying drawings.

BRIEF DESCRIPTION OF THE ACCOMPANYING DRAWINGS

Rig. 6 is an enlarged sectional view of slip rings, brushes and parts therearound of FIG. 5.

DETAILED DESCRIPTION OF THE PREFERRED EMBODIMENTS

Embodiment 1

Figure 1:
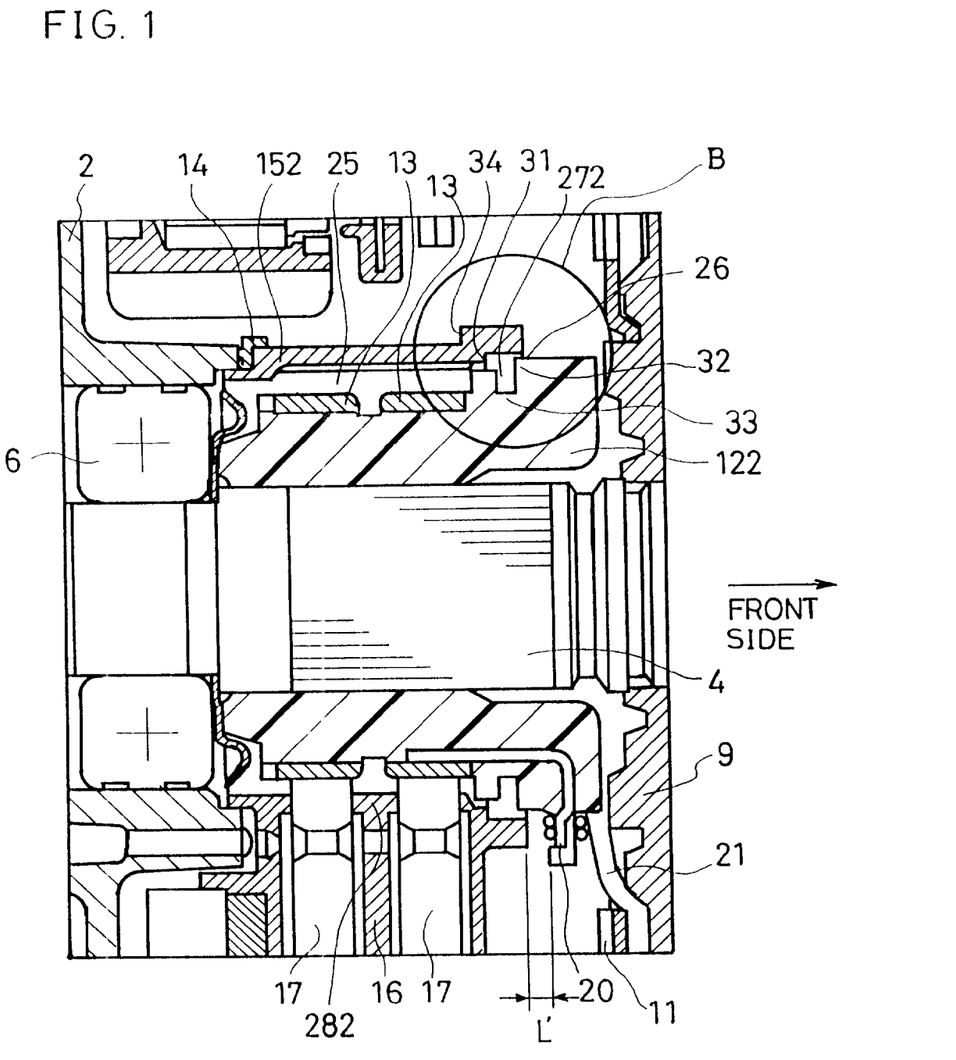
FIG. 1 is an enlarged sectional view of slip rings, brushes and parts therearound according to Embodiment 1 of the present invention.
Figure 2:
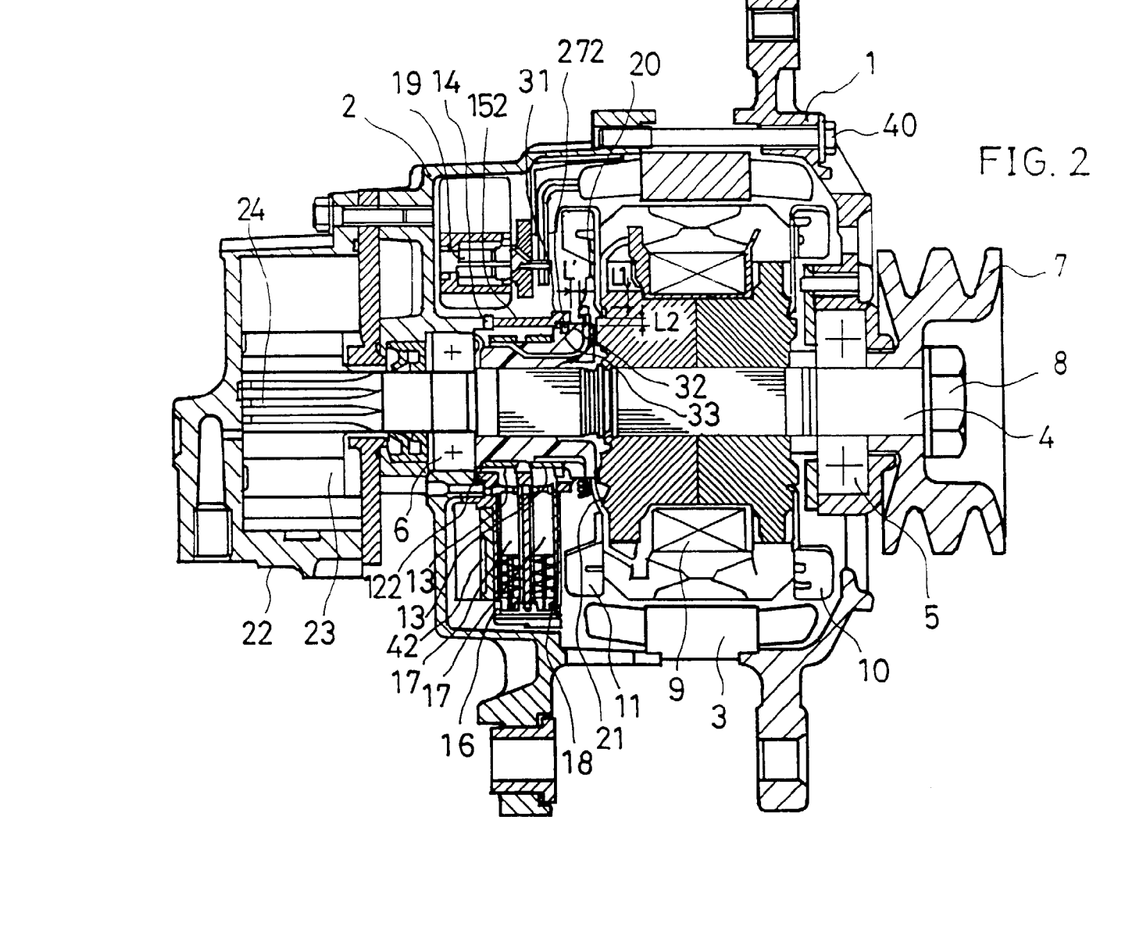
FIG. 2 is a sectional view of a car AC generator equipped with a vacuum pump according to Embodiment 1.
Figure 3:
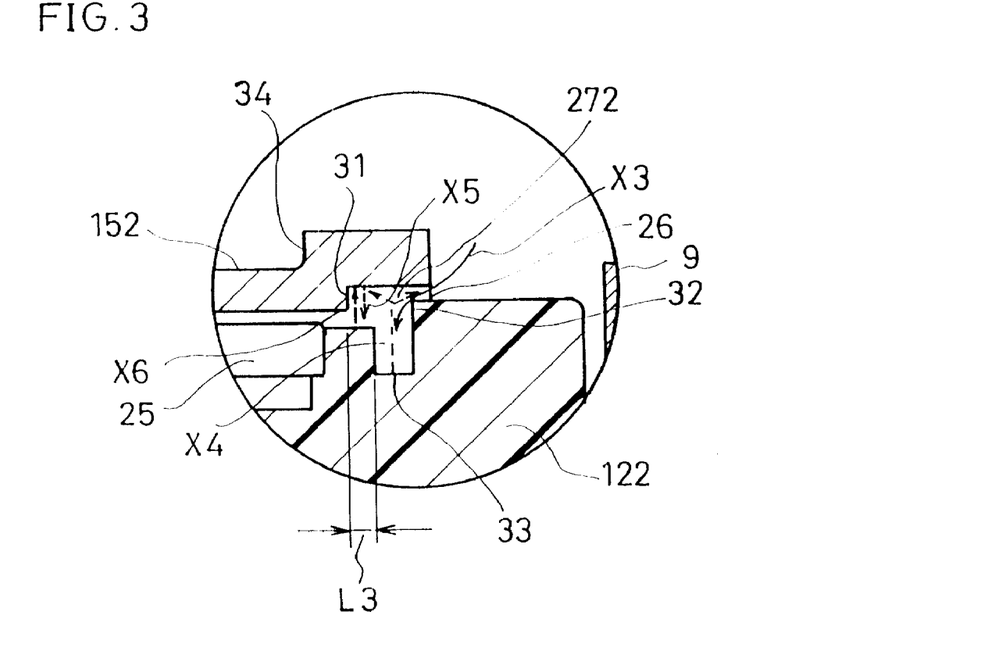
FIG. 3 is an enlarged sectional view of a labyrinth in a portion B of FIG. 1.
Figure 4:
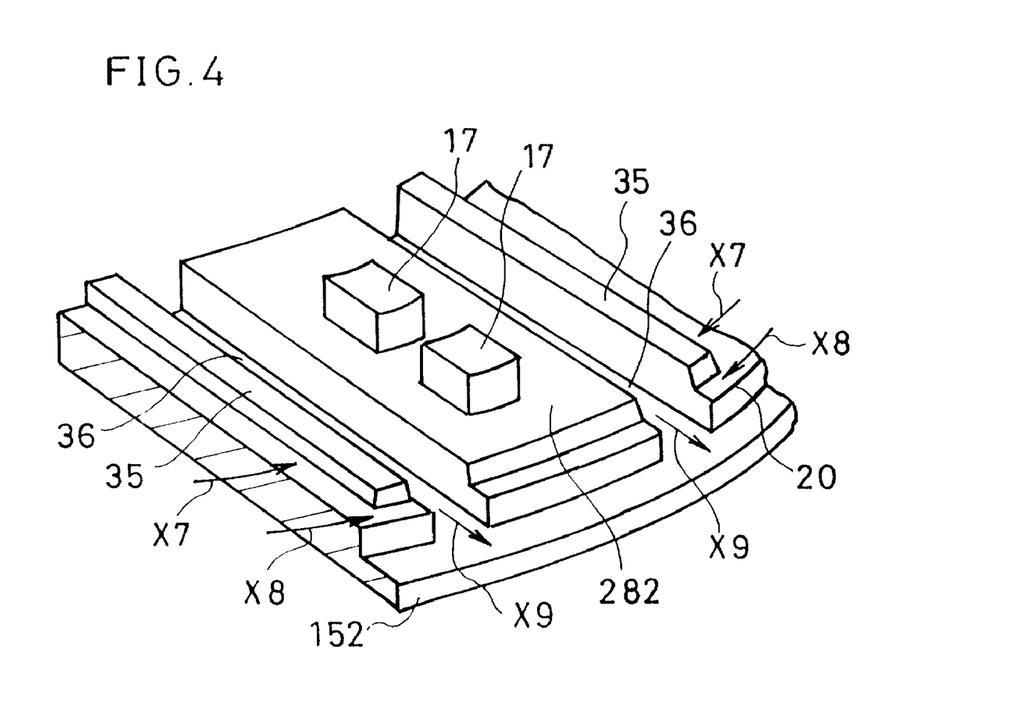
FIG. 4 is a perspective view of a brush holder unit of FIG. 1 when seen from the front side.

FIG. 1 is an enlarged sectional view of slip rings 13, brushes 17 and parts therearound in a car AC generator equipped with a vacuum pump according to Embodiment 1 of the present invention, FIG. 2 is a sectional view of the above car AC generator equipped with a vacuum pump, FIG. 3 is an enlarged sectional view of a labyrinth 272 in a portion B of FIG. 1, and FIG. 4 is a perspective view of the brush holder unit 16 of FIG. 1 when seen from the front side. A slip ring terminal lead wire 20 depicted in the upper portion of FIG. 2 is omitted in FIG. 1.

In FIG. 2, in Embodiment 1, the labyrinth 272, which is defined by (1) a cylindrical slip ring support unit 122 fixed to a generator shaft 4 and (2) a cylindrical slinger unit 152 fixed to the center portion of a bracket rear 2 so as to surround the slip ring support unit 122, is formed as a stepped structure by an annular slinger-side stepped portion projecting toward the generator shaft 4 from the inner peripheral surface of the slinger unit 152 and a slip ring-side stepped portion 32 projecting toward the slinger unit 152 from the outer peripheral surface of the slip ring support unit 122. Meanwhile, an annular groove 33 is formed in the outer peripheral surface of the slip ring support unit 122 on the slip ring 13 side of the slip ring-side stepped portion 32. The annular groove 33 is located between the slinger-side stepped portion 31 and an opening 26. Parts such as the bracket front 1, the bracket rear 2, the stator 3, the generator shaft 4, the bearing front 5, the bearing rear 6, the pulley 7, the nut 8, the rotor 9, the fan front 10, the fan rear 11, the slip rings 13, the packing 14, the brush holder unit 16, the brushes 17, the brush spring 18, the rectifier 19, the vacuum pump 22 and the vacuum pump rotor 23 are the same as those of the car AC generator equipped with a vacuum pump of the prior art.

As shown in FIG. 1, in this Embodiment 1, as a waterproof structure for water flowing from the opening 26, the labyrinth 272 is formed as a stepped structure in a radial direction by the slinger-side stepped portion 31, the slip ring-side stepped portion 32 and the annular groove 33. Therefore, water entering the labyrinth 272 from the opening 26 hardly flows into contact portions between the slip rings 13 and the brushes 17.

For instance, during the operation of the generator, water entering the annular groove 33 shown by an arrow X3 in FIG. 3 is scattered in a circumferential direction by centrifugal force as shown by an arrow X4 in FIG. 3 and hits against the inner peripheral surface of the slinger unit 152, and most of the water is adhered to the inner peripheral surface of the slinger unit 152. As the inner peripheral surface of the slinger unit 152 has the slinger-side stepped portion 31, the water adhered to the slinger unit 152 flows down and toward the front side along the inner peripheral surface of the slinger unit 152. Water running into the front side of the slinger unit 152 drops onto the outer peripheral surface of the slip ring support unit 122 at the opening 26 and is exhausted to the inside space of the outer shell of the generator by centrifugal force from the slip ring support unit 122. The rest of the water hits against the inner peripheral surface of the slinger unit 152, and is is repelled toward the slip ring support unit 122 by the slinger unit 152 as shown by an arrow X5 in FIG. 3. Most of the repelled water is again scattered in a circumferential direction by centrifugal force again as shown by an arrow X6 in FIG. 3, adhered to the slinger unit 152 and flows down and toward the front side along the inner peripheral surface of the slinger unit 152 as described above. The rest of water which is not adhered to the slinger unit 152 and repelled toward the slip ring support unit 122 by the slinger unit 152 is introduced into the annular groove 33. The water introduced into the annular groove 33 is scattered in a circumferential direction by centrifugal force as shown by a dotted line in FIG. 3 and hit against the inner peripheral surface of the slinger unit 152, and most of the water is adhered to the inner peripheral surface of the slinger unit 152 and exhausted to the inside space of the outer shell of the generator from the labyrinth 272.

Since the annular groove 33 is located between the slinger-side stepped portion 31 and the opening 26, water entering the labyrinth 272 from the opening 26 as shown by a solid line in FIG. 3 is introduced into the annular groove 33 and flows down during the suspension of the generator. The water introduced into the annular groove 33 drops onto the inner peripheral surface of the slinger unit 152 from the lower portion of the slip ring support unit 122 and is exhausted to the inside space of the outer shell of the generator from the opening 26 of the slinger unit 152.

In FIG. 3, when the distance L3 between the slinger-side stepped portion 31 and the annular groove 33 is smaller than "0", that is, the annular groove 33 is formed in the direction of the slip rings 13 from the slinger-side stepped portion 31, the scattering and repelling of water shown by dotted lines, which depend on the depth of the annular groove 33, decrease. Therefore, as compared with the case of L3>0 wherein the annular groove 3 is located between the slinger-side stepped portion 31 and the opening 26 as in Embodiment 1, the effect of preventing water from flowing into the contact portions between the slip rings 13 and the brushes 17 is small.

Referring back to FIG. 2, the slinger unit 152 extends toward the slip ring terminal lead wire 20 more than the slinger unit 15 of FIG. 8 and a gap L' formed between the slip ring terminal lead wire 20 and the slinger unit 152 is made small as far as relative rotation can occur without interference between the slinger unit 152 the slip ring lead wire 20 (L'<L). Therefore, water hardly enters the opening 26 from the gap L'. The diameter of the outer peripheral surface on the opening 26 side of the slinger unit 152 is made larger than the diameter of the outer peripheral surface on the opening 26 side of the slinger unit 15 shown in FIG. 8. Therefore, an outer stepped portion 34 formed by the size difference between the outer peripheral surface on the opening 26 side of the slinger unit 152 and the outer peripheral surface on the bearing rear 6 side of the slinger unit 152 becomes a great barrier for water running toward the front side along the outer peripheral surface on the bearing rear 6 side. Consequently, water hardly flows over the outer stepped portion 34 and most of the water flows down along the outer peripheral surface on the bearing rear 6 side of the slinger unit 152 before the outer stepped portion 34, thereby greatly reducing the amount of water entering the opening 26.

Referring to FIG. 4, the lower side structure of the slinger unit 152 will be described. A plurality of banks 35 extending in an axial direction are formed on the inner peripheral surface of the slinger unit 152. The banks 35 are located on both sides in a circumferential direction of a brush seat 282. The banks 35 guide water shown by arrows X7 flowing down along the inner peripheral surface of the slinger unit 152 to the opening 26 side. This guided water is exhausted to the inside space of the outer shell of the generator from the opening 26.

A plurality of grooves 36 extending in an axial direction are formed in the inner peripheral surface of the slinger unit 152. These grooves 36 are located between the brush seat 282 and the banks 35 and have such a gradient that water flows toward a front direction. When water shown by the arrows X7 flows over the banks 35, the grooves 36 catch the water. Water shown by arrows X8 passing the front sides of the banks 35 is caught by the grooves 36. Water caught by the grooves 36 is exhausted to the inside space of the outer shell of the generator from the opening 26 by the grooves 36 as shown by the arrows X9.

Since the brush seat 282 is made higher than the brush seat 28 of the prior art, it is possible to prevent water from flowing over the brush seat 282 from the grooves 36.

Embodiment 2

Figure 5:
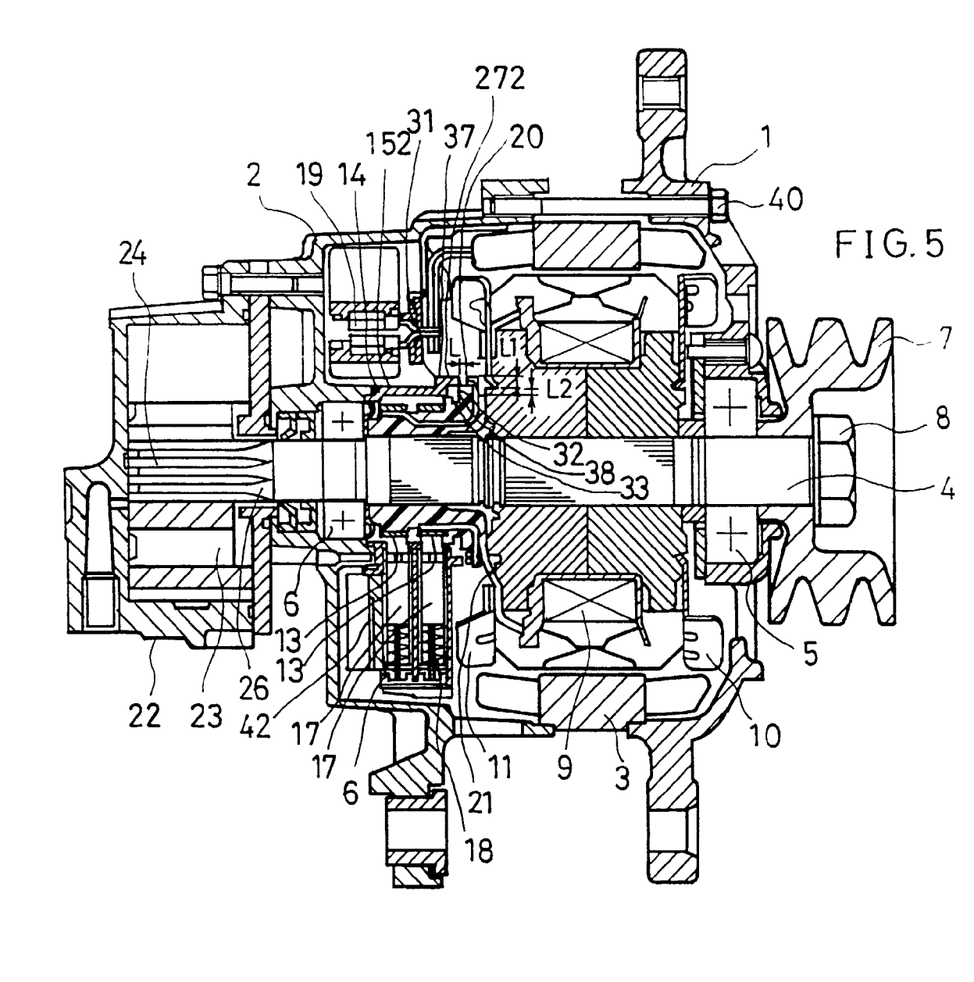
FIG. 5 is a sectional view of a car AC generator equipped with a vacuum pump according to Embodiment 2 of the present inventor.
Figure 6:
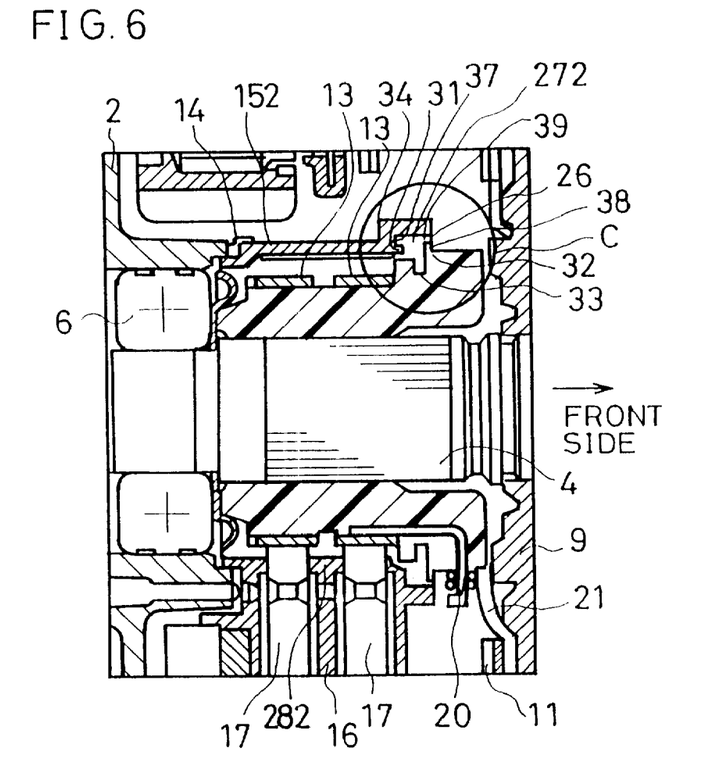
Figure 7:
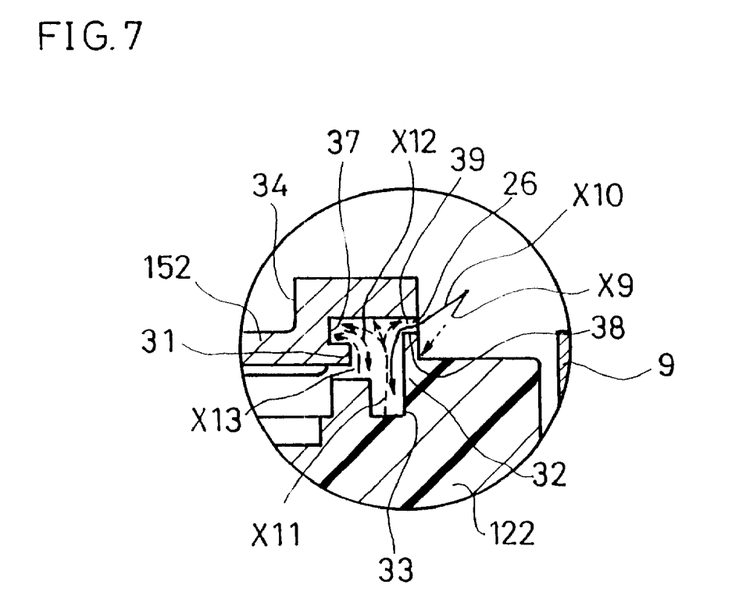
FIG. 7 is an enlarged sectional view of a labyrinth in a portion C of FIG. 6.

FIG. 5 is a sectional view of a car AC generator equipped with a vacuum pump according to Embodiment 2 of the present invention, FIG. 6 is an enlarged sectional view of the slip rings 13, the brushes 17 and parts therearound of FIG. 5, and FIG. 7 is an enlarged sectional view of the labyrinth 272 in the portion C of FIG. 6. The slip ring terminal lead wire 20 depicted in the upper portion of FIG. 5 is omitted in FIG. 6.

In FIG. 5 and FIG. 6, this Embodiment 2 is the same as Embodiment 1 except that an annular moat 37 is formed in an annular stepped surface between the inner peripheral surface of the slinger unit 152 and the slinger-side stepped portion 31 and that an annular bank 38 is formed on the outer peripheral surface of the slip ring support unit 122 on the opening 26 side of the annular groove 33.

In this Embodiment 2, as the gap 39 formed in a radial direction between the inner peripheral surface of the slinger unit 152 and the annular bank 38 in the opening 26 is narrow, the amount of water entering the labyrinth 272 from the inside space of the outer shell of the generator through the gap 39 in the radial direction can be reduced. The annular bank 38 becomes a great barrier for water shown by an arrow X9 in FIG. 7 which flows toward a rear direction along the outer peripheral surface of the slip ring support unit 122 on the front side of the annular bank 38. Therefore, water hardly flows over the annular bank 38 and is exhausted to the inside space of the outer shell of the generator before the annular bank 38.

During the operation of the generator, water entering the annular groove 33 shown by an arrow X10 in FIG. 7 is scattered in a circumferential direction by centrifugal force as shown by an arrow X11, hit against the inner peripheral surface of the slinger unit 152 and caught by the annular moat 37. Most of the water hit against the inner peripheral surface of the slinger unit 152 is adhered to the inner peripheral surface of the slinger unit 152 and exhausted to the inside space of the outer shell of the generator by the same route as in Embodiment 1. Water caught by the annular moat 37 flows down along the annular moat 37 and is hit against the outside surface of the brush holder unit 16 and exhausted to the inside space of the outer shell of the generator from the opening 26. As shown by arrows X12 and X13 in FIG. 7, water scattered repeatedly between the annular moat 37 and the outer peripheral surface of the slip ring support unit 122 is caught by the annular moat 37 in the end, flows down along the annular moat 37, and is hit against the outside surface of the brush holder unit 16 and exhausted to the inside of the outer shell of the generator from the opening 26.

During the suspension of the generator, water entering the labyrinth 272 from the gap 39 formed in the radial direction is introduced into the annular groove 33, flows down and is thereby exhausted to the inside space of the outer shell of the generator as in Embodiment 1.

In Embodiments 1 and 2, the car AC generator equipped with a vacuum pump has been described. The structure of the labyrinth 272 can be applied to a car AC generator without a vacuum pump.

In Embodiments 1 and 2, the bottom surface of the annular groove 33 is made parallel to the generator shaft 4. When the bottom surface of the annular groove 33 is inclined such that it descends toward the front side, water scattered by the centrifugal force of the rotor 9 can be directed toward the opening 26.

In Embodiments 1 and 2, the slinger-side stepped portion 31 is made perpendicular to the generator shaft 4. When the slinger-side stepped portion 31 is inclined such that it descends toward the rear side, water repelled by the slinger-side stepped portion 31 can be directed toward the annular groove 33.

As described above, according to the first aspect of the present invention, since the labyrinth defined by the outer peripheral surface of the slip ring support unit and the inner peripheral surface of the slinger unit is formed as a stepped structure in a radial direction by the slinger-side stepped portion, the slip ring-side stepped portion and the annular groove, water entering the labyrinth hardly flows into the contact portions between the slip rings and the brushes, thereby improving a waterproofing effect.

According to the second aspect of the present invention, since the annular groove is located between the slinger-side stepped portion and the opening of the slinger unit, the waterproofing effect can be further improved.

According to the third aspect of the present invention, since banks extending in an axial direction are formed on the inner peripheral surface of the slinger unit, water flowing down along the inner peripheral surface of the slinger unit can be guided to the opening from the banks and exhausted to the inside space of the outer shell of the generator.

According to the fourth aspect of the present invention, since grooves extending in an axial direction are formed in the inner peripheral surface of the slinger unit, water flowing down along the inner peripheral surface of the slinger unit can be guided to the opening from the grooves and exhausted to the inside space of the outer shell of the generator.

According to the fifth aspect of the present invention, since an annular moat is formed in the annular stepped surface between the inner peripheral surface of the slinger unit and the slinger-side stepped portion, water scattered toward the slinger unit from the slip ring support unit can be guided down in a circumferential direction by the annular moat and exhausted to the inside space of the outer shell of the generator.

According to the sixth aspect of the present invention, since an annular bank is formed on the outer peripheral surface of the slip ring support unit on the opening side of the annular groove, the gap in a radial direction between the inner peripheral surface of the slinger unit and the annular bank in the opening can be made small, thereby making it possible to reduce the amount of water entering the labyrinth from the inside space of the outer shell of the generator. Water flowing toward the labyrinth along the outer peripheral surface of the slip ring support unit extending forward from the opening can be prevented by the annular bank.

What is claimed is:

1. A vehicle AC generator comprising:
    a cylindrical slip ring support unit fixed to a generator shaft, the slip ring support unit having an outer peripheral surface extending around the generator shaft;
    a cylindrical slinger unit fixed to an outer shell of the generator, the slinger unit having an inner peripheral surface extending around the slip ring support unit and defining an opening that faces in an axial direction of the generator shaft; and
    a labyrinth formed by (1) an annular slinger-side stepped portion projecting toward the generator shaft from the inner peripheral surface of the slinger unit, (2) an annular slip ring-side stepped portion projecting toward the slinger unit from the outer peripheral surface of the slip ring support unit, and (3) an annular groove provided in the outer peripheral surface of the slip ring support unit,
    wherein the labyrinth prevents a fluid in the generator from entering into a chamber in which a slip ring provided on the slip ring support unit makes electrical contact with a brush provided on the slinger unit, and
    wherein the slip ring support unit does not completely cover the opening in the slinger unit from the axial direction.

2. The vehicle AC generator of claim 1, wherein the annular groove is located in an axial direction between the slinger-side stepped portion and the opening of the slinger unit.

3. The vehicle AC generator of claim 1, further comprising:
    a plurality of banks formed on the inner peripheral surface of the slinger unit and extending in the axial direction.

4. The vehicle AC generator of claim 1, further comprising:
    a plurality of grooves formed in the inner peripheral surface of the slinger unit and extending in the axial direction.

5. The vehicle AC generator of claim 1, further comprising:
    an annular moat formed in an annular stepped surface between the inner peripheral surface of the slinger unit and the slinger-side stepped portion.

6. The vehicle AC generator of claim 1, further comprising:
    an annular bank formed on the outer peripheral surface of the slip ring support unit on the opening side of the annular groove.

7. A vehicle AC generator comprising:
    a cylindrical slip ring support unit fixed to a generator shaft, the slip ring support unit having an outer peripheral surface extending around the generator shaft;
    a cylindrical slinger unit fixed to an outer shell of the generator, the slinger unit having an inner peripheral surface extending around the slip ring support unit and defining an opening that faces in an axial direction of the generator shaft; and
    a labyrinth formed by (1) an annular slinger-side stepped portion projecting toward the generator shaft from the inner peripheral surface of the slinger unit, (2) an annular slip ring-side stepped portion projecting toward the slinger unit from the outer peripheral surface of the slip ring support unit, and (3) an annular groove provided in the outer peripheral surface of the slip ring support unit,
    wherein the annular groove is located in an axial direction between the slinger-side stepped portion and an opening of the slinger unit and
    wherein the slip ring support unit does not completely cover the opening in the slinger unit from the axial direction.

8. A vehicle AC generator comprising:
    a cylindrical slip ring support unit fixed to a generator shaft, the slip ring support unit having an outer peripheral surface extending around the generator shaft;
    a cylindrical slinger unit fixed to an outer shell of the generator, the slinger unit having an inner peripheral surface extending around the slip ring support unit and defining an opening that faces in an axial direction of the generator shaft;
    a labyrinth formed by (1) an annular slinger-side stepped portion projecting toward the generator shaft from the inner peripheral surface of the slinger unit, (2) an annular slip ring-side stepped portion projecting toward the slinger unit from the outer peripheral surface of the slip ring support unit, and (3) an annular groove provided in the outer peripheral surface of the slip ring support unit; and
    an annular moat formed in an annular stepped surface between the inner peripheral surface of the slinger unit and the slinger-side stepped portions
    wherein the slip ring support unit does not completely cover the opening in the slinger unit from the axial direction.

* * * * *